United States Patent
Shade

[19]

[11] Patent Number: 5,842,727
[45] Date of Patent: Dec. 1, 1998

[54] COUPLING FOR SPIRAL CORRUGATED PIPE

[75] Inventor: James W. Shade, Middletown, Ohio

[73] Assignee: Contech Construction Products, Inc., Middletown, Ohio

[21] Appl. No.: 788,942

[22] Filed: Jan. 24, 1997

[51] Int. Cl.⁶ .................................................. F16L 55/00
[52] U.S. Cl. .............................. 285/148.19; 285/148.22; 285/334; 285/369; 285/417; 285/903
[58] Field of Search ........................ 285/148.19, 148.22, 285/903, 333, 334, 355, 390, 369, 417

[56] References Cited

U.S. PATENT DOCUMENTS

| 3,471,179 | 10/1969 | Sixth ................................. 285/148.22 |
| 3,797,865 | 3/1974 | Ballentine . |
| 3,899,198 | 8/1975 | Maroschak . |
| 4,061,368 | 12/1977 | Auriemma . |
| 4,566,496 | 1/1986 | Menzel et al. . |
| 4,588,213 | 5/1986 | Bollfrass ............................. 285/355 X |
| 4,660,860 | 4/1987 | Todd .................................. 285/903 X |
| 5,221,113 | 6/1993 | Stoll ....................................... 285/333 |
| 5,318,328 | 6/1994 | Dawson ............................... 285/903 X |
| 5,478,123 | 12/1995 | Kanao . |

FOREIGN PATENT DOCUMENTS 2906317  8/1979  Germany ............................... 285/903

Primary Examiner—Dave W. Arola
Attorney, Agent, or Firm—Wood, Herron & Evans, LLP

[57] ABSTRACT

A coupling for interconnecting adjacent ends of spiral corrugated pipe includes a generally cylindrically shaped body having generally tubular ends extending axially outwardly from a circumferential stop. One of the tubular ends defines a substantially continuous spiral or thread which is adapted to threadably connect to one of the adjacent ends of spiral corrugated pipe. The other tubular end of the coupling defines a sleeve which is adapted to slidably receive the other of the adjacent ends of spiral corrugated pipe within the sleeve to thereby interconnect the adjacent ends of pipe. Gaskets may be provided within the coupling to further reduce infiltration or exfiltration at the coupling. In an alternative embodiment, the coupling includes a generally cylindrically shaped body having generally tubular ends which each define a substantially continuous spiral or thread. The tubular ends are adapted to be threadably connected to adjacent ends of corrugated spiral pipe to form an interconnection therebetween.

20 Claims, 3 Drawing Sheets

COUPLING FOR SPIRAL CORRUGATED PIPE

FIELD OF THE INVENTION

The present invention relates generally to joints, couplings or connectors for pipe and, more particularly, to a coupling for joining or interconnecting adjacent ends of spiral corrugated pipe.

BACKGROUND OF THE INVENTION

Spiral corrugated pipe is widely used in the construction industry to make drainage conduits for water, sewage and other types of effluents. Typically, the spiral corrugated pipe is manufactured of metal, plastic or any other suitable material which has sufficient crush strength, durability and resistance to deterioration for a given application. In order to construct a desired length of conduit, sections of spiral corrugated pipe are typically laid in end-to-end abutting relationship, and then the adjacent ends are interconnecting by pipe couplings to form a substantially fluid or soil tight seal at each joint of the conduit. The spiral corrugated pipe may be shipped from the supplier with a coupling already attached at one end of the pipe so that only one connection at each joint needs to be made in the field.

Many different pipe coupling configurations are known in the art for interconnecting adjacent ends of pipe. For example, U.S. Pat. No. 5,478,123 issued to Kanao discloses a spiral corrugated pipe joint for connecting spiral corrugated pipe ends. The pipe joint includes a limited or discontinuous spiral projection or thread between axially spaced sealing bodies on one end of the joint to engage with a spiral corrugated pipe end. The pipe joint further includes a cylindrical body portion at the other end of the joint to join with another spiral corrugated pipe end. Sealant material is introduced into a cavity formed between the axially spaced sealing bodies of the pipe joint and the spiral corrugated pipe end for sealing the pipe connection.

U.S. Pat. No. 3,797,865 issued to Ballentine discloses an adapter for connecting a corrugated or threaded conduit to a smooth-walled conduit. The adapter includes a first body portion having along its length a right-handed screw thread for securement to a corrugated conduit. A second body portion having a pair of diametrically opposed concaved land sections and a left-handed acute angled chamfered screw thread is adapted to be inserted within the interior of the smooth-walled conduit. The angled thread hinders axial separation of the adapter from the smooth-walled conduit.

U.S. Pat. No. 3,899,198 issued to Maroschak discloses a coupling for interconnecting corrugated plastic tubes. The coupling comprises a tubular plastic body having annular sleeve portions for receiving the ends of corrugated plastic tubes therein, a plurality of rigid, hollow, substantially hemispherical latching projections spaced around the sleeve portions and extending inwardly therefrom for engaging the corrugated plastic tubes in the sleeve portions and effecting a connection between the coupling and the tubes, and stop means extending inwardly from the tubular body for limiting the extent to which the corrugated plastic tubes may be received in the coupling.

U.S. Pat. No. 4,061,368 issued to Auriemma discloses a coupling for spiral drain pipe. The coupling for joining spiral drainage pipes includes a cylindrical body with an inner circumferential flange and opposed locking projections or dimples. When the coupling is rotated onto the drainage pipes, the ends of the pipes are held flush on the flange by the dimples to form a smooth continuation of the inner surfaces of the pipe.

Notwithstanding the aforementioned advances in the pipe coupling art, there exists a need for a coupling particularly adapted for joining adjacent ends of spiral corrugated pipe which is easy to install in the field without requiring extensive manipulation of the pipe ends. Moreover, there exists a need for a spiral corrugated pipe coupling which does not require complicated latching structures or sealants to form a connection at the pipe joint. Additionally, there is a need for a spiral corrugated pipe coupling which offers versatile configurations for addressing different infiltration and exfiltration requirements which may be encountered in various applications.

SUMMARY OF THE INVENTION

To these ends, a coupling for interconnecting adjacent ends of spiral corrugated pipe is provided, in one embodiment, with a generally cylindrically shaped body having generally tubular ends extending radially outwardly from a circumferential stop. One of the tubular ends defines a substantially continuous spiral or thread which is adapted to be threadably connected to one of the adjacent ends of spiral corrugated pipe. The other tubular end defines a sleeve which is adapted to slidably receive the other of the adjacent ends of spiral corrugated pipe within the sleeve. As the adjacent ends of pipe are advanced within the coupling toward the circumferential stop, free ends of the spiral corrugated pipes preferably abut the circumferential stop to form a fluid or soil tight seal with the conduit.

The spiral or threaded tubular end is adapted to thread either about the outer diameter or within the inner diameter of the spiral corrugated pipe end. To further reduce infiltration or exfiltration at the joint or connection, one or more gaskets may be used to form a seal between ends of the spiral corrugated pipe and the coupling.

Additionally, sealants may be used to further seal the threaded connection between the threads of the tubular end and the end of the spiral corrugated pipe.

In an alternative embodiment of the present invention, the coupling includes a generally cylindrically shaped body having generally tubular ends which each define a substantially continuous spiral or thread. The tubular ends are adapted to be threadably connected to adjacent ends of corrugated spiral pipe to form an interconnection therebetween. The spiral or threaded tubular ends are adapted to thread either about the outer diameters or within the inner diameters of the adjacent spiral corrugated pipe ends.

The objects and advantages of the present invention will be further appreciated in light of the following detailed description and drawings in which:

DETAILED DESCRIPTION OF THE PREFERRED EMBODIMENTS

Figure 1:
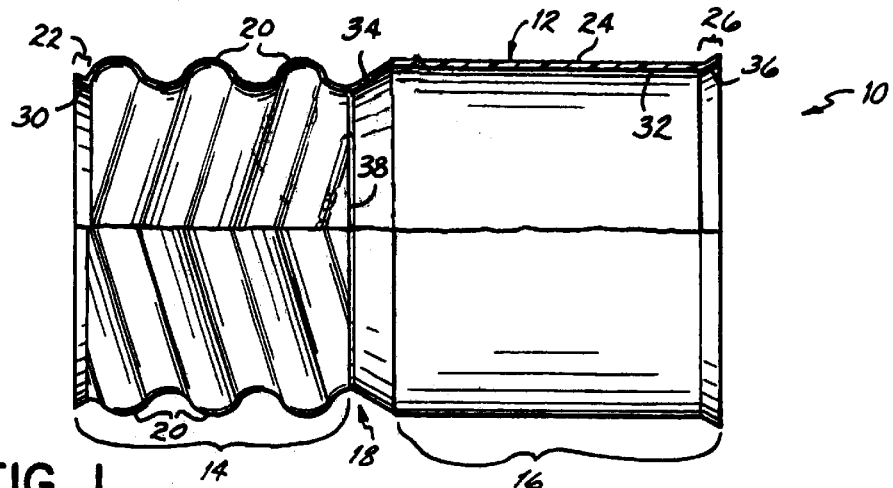
FIG. 1 is a side elevational view, partially in cross-section, of a coupling in accordance with a first embodiment of the present invention for interconnecting adjacent ends of spiral corrugated pipe.

With reference to the FIGS, and to FIG. 1 in particular, a coupling 10 in accordance with one embodiment of the present invention is shown for joining or interconnecting adjacent ends of spiral corrugated pipe. Coupling 10 includes a generally cylindrically shaped body 12, preferably made of rigid plastic, having respective generally tubular ends 14 and 16, each of generally uniform thickness, extending axially outwardly from a circumferential stop 18. Tubular end 14 preferably defines a substantially corrugated spiral or thread 20 which extends between the circumferential stop 18 and a free edge 22 of the tubular end 14. Tubular end 16 preferably defines a sleeve 24 extending substantially between the circumferential stop 18 and a free edge 26 of tubular end 16. As will be described in more detail below, the spiral thread 20 of tubular end 14 is adapted to threadably connect to one end of standard spiral corrugated pipe, while the sleeve 24 of tubular 16 is adapted to slidably receive an adjacent end of standard spiral corrugated pipe within the sleeve. In this way, the coupling 10 preferably creates a fluid or soil tight seal between the adjacent ends of spiral corrugated pipe to reduce or substantially eliminate infiltration or exfiltration within the conduit formed by the interconnected spiral corrugated pipe ends.

Figure 2:
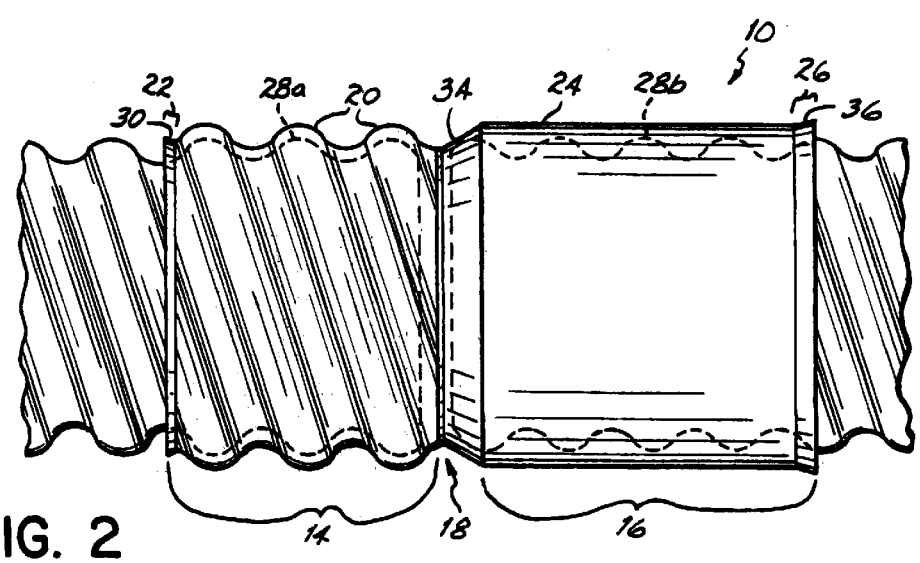
FIG. 2 is a side elevational view showing the coupling of FIG. 1 in use for interconnecting adjacent ends of spiral corrugated pipe.

As shown most clearly in FIG. 2, the tubular end 14 has an inner diameter which is preferably slightly larger than the outer diameter of spiral corrugated pipe end 28a. The spiral corrugation or thread 20 of tubular end 14 is adapted to thread with the helical corrugations of pipe end 28a to form an interconnection between the coupling 10 and the spiral corrugated end 28a. Preferably, the free edge 22 of tubular end 14 defines a radially outwardly flared entry 30 disposed at a 15° angle from horizontal to facilitate the initial threading of the tubular end 14 about the outer diameter of the corrugated spiral pipe end 28a when the pipe end is out-of-round.

With further reference to FIG. 2, the sleeve 24 of tubular end 16 preferably has an inner diameter, defined by smooth wall 32 (see FIG. 1), which is slightly larger that the outer diameter of spiral corrugated pipe end 28b and which tapers at 34 adjacent the circumferential stop 18. In this way, tubular end 16 is adapted to slidably receive spiral corrugated pipe end 28b within sleeve 14. Preferably, the free edge 26 of tubular end 16 defines a radially outwardly flared entry 36, also disposed at a 15° angle from horizontal, to facilitate sliding of the corrugated spiral pipe end 28b within the tubular sleeve 24 when the pipe end 28b is out-of-round and when gaskets are attached to the spigot end of the connection as will be described in more detail below. In use, the coupling 10 is preferably threadably connected to the spiral corrugated end 28a at the plant such that only the connection of the tubular end 16 and the corrugated spiral pipe end 28b is required in the field.

As shown most clearly in FIGS. 1 and 2, the tubular ends 14 and 16 terminate at the circumferential stop 18. The circumferential stop 18 is preferably a continuous radially inwardly extending annular ring 38 (see FIG. 1) which has an inner diameter slightly less than the outer diameters of corrugated spiral pipe ends 28a and 28b. In this way, as the tubular end 14 is threaded about the outer diameter of corrugated spiral pipe end 28a, rotation of the coupling 10 about the pipe end 28a will cease when the pipe end abuts the circumferential stop 18. Likewise, as the corrugated spiral end 28b is slidably received in the sleeve 24 of tubular end 16, the pipe end 28b will abut the circumferential stop 18. In other embodiments not shown, it is also contemplated that the circumferential stop 18 may not be continuous, and may not extend radially inwardly as the annular ring 38. Those skilled in the art will appreciate that the circumferential stop 18 may comprise any suitable structure for the purpose of defining a stop within the coupling 10.

Figure 3:
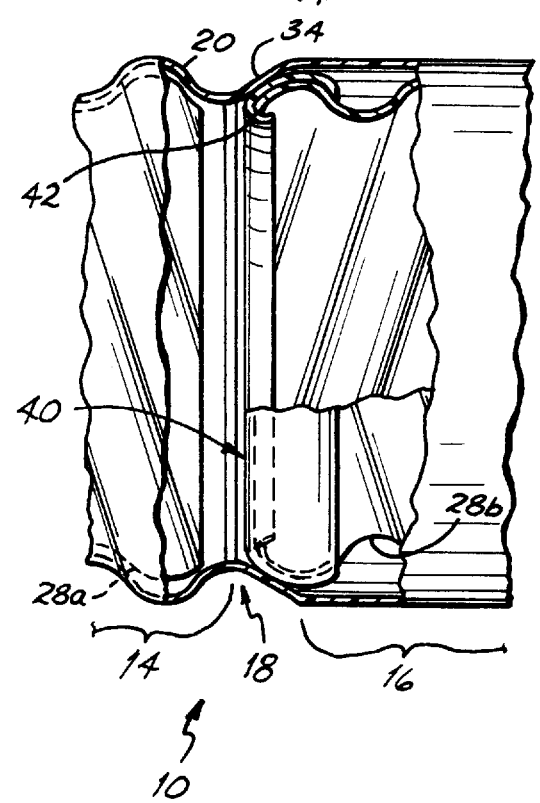
FIG. 3 is a view similar to FIG. 2, partially broken away, showing a gasket mounted on one end of spiral corrugated pipe in accordance with a second embodiment of the present invention.

Depending on the infiltration and exfiltration requirements of the pipe interconnection, the abutting relationship of the spiral corrugated pipe ends 28a and 28b with the circumferential stop 18 may establish the necessary fluid or soil tight seal at the interconnection of pipe ends 28a and 28b with the conduit 10. To further provide a tight seal at the joint, it is contemplated in another embodiment (not shown) that either of the tubular ends 14 and 16, or both, may have inner diameters which taper or decrease along their respective lengths from free edges 22 and 26 to the circumferential stop 18. In this way, the tubular ends 14 and 16 will tighten about the outer diameter of respective spiral corrugated pipe ends 28a and 28b as the pipe ends advance within the coupling 10 toward the circumferential stop 18. In another contemplated embodiment (not shown), either of the tubular ends 14 and 16, or both, may have inner diameters which are substantially constant along their respective lengths from free edges 22 and 26 to the circumferential stop 18, and which then taper or decrease adjacent the circumferential stop. In this way, the tubular ends 14 and 16 will tighten about the outer diameter of respective spiral corrugated pipe ends 28a and 28b only as the pipe ends approach the circumferential stop 18 within the coupling 10.

Where higher infiltration or exfiltration reduction is necessary, FIG. 3 shows a second embodiment of the present invention for interconnecting spiral corrugated pipe ends 28a and 28b with coupling 10. In this embodiment, an annular gasket 40, made from any suitable resilient material, is placed about a free edge 42 of pipe end 28b such that the gasket forms a seal with the inner wall 32 of tubular end 16 and the circumferential stop 18 as the pipe end 28b is slidably received within the sleeve 24. It is also contemplated that a commercially available standard sealant (not shown) may be used between the spiral threads 20 of tubular end 14 and the spiral corrugated pipe end 28a for improved infiltration or exfiltration reduction. In another embodiment (not shown), an annular resilient gasket may be adhered to the circumferential stop 18 within coupling 10 to form a seal with one or more of the spiral corrugated pipe ends 28a and 28b as they are advanced toward the circumferential stop.

Figure 5:
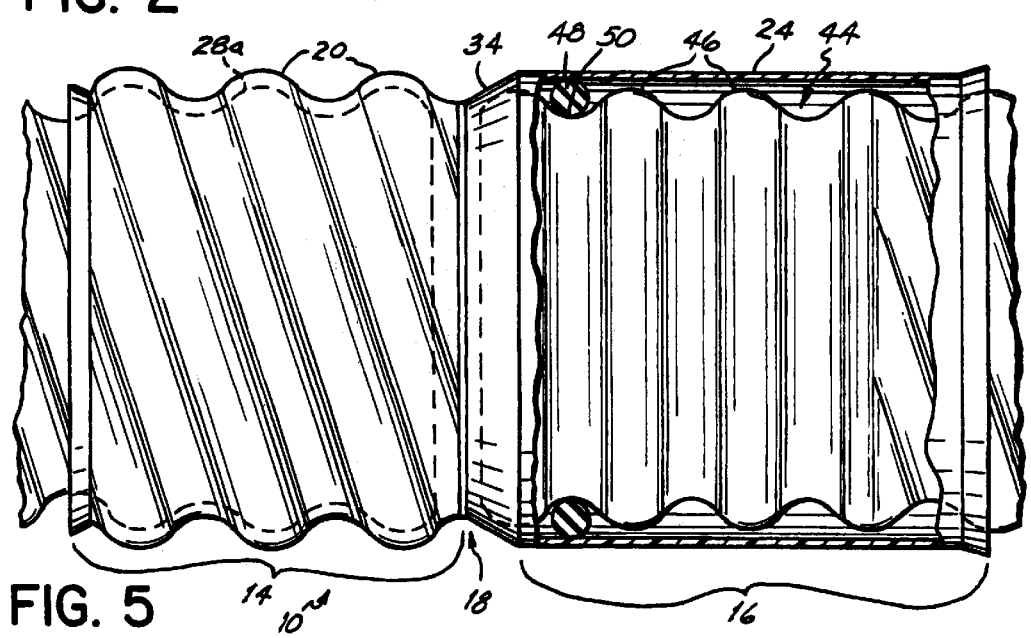
FIG. 5 is a view similar to FIG. 2, partially broken away, showing a gasket mounted on one end of recorrugated pipe in accordance with a fourth embodiment of the present invention.

As shown in FIG. 5, in those instances where a spiral corrugated pipe has a recorrugated annular end 44 having non-spiral or annular corrugations 46, an annular resilient gasket 48 may be placed in a groove 50 defined between adjacent annular corrugations 46 to form a seal between the pipe end 44 and the inner wall 32 of sleeve 24. Other sealants and gaskets may also be used in this embodiment as described in detail above with reference to FIG. 3.

Figure 4:
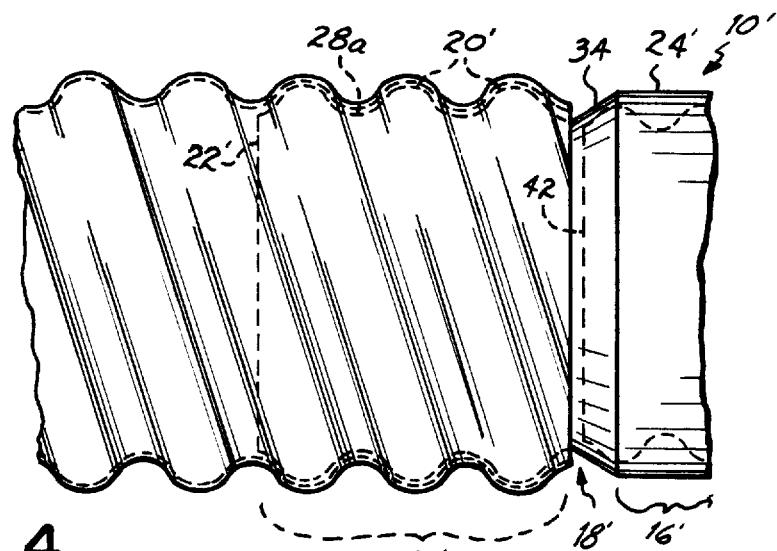
FIG. 4 is a side elevational view, partially broken away, of a coupling in accordance with a third embodiment of the present invention.

Referring to an alternative embodiment shown in FIG. 4, a coupling 10' is shown having a generally tubular end 14' which defines a substantially corrugated spiral or thread 20' extending between a circumferential stop 18' and a free edge 22' of the tubular end 14'. The generally tubular end 16' defines sleeve 24' which extends between the circumferential stop 18' and the free edge of the tubular end 16' (not shown). In this embodiment, the tubular end 14' has an outer diameter which is slightly less than the inner diameter of the spiral corrugated pipe end 28*a* such that the spiral thread 20' is adapted to thread within the inner diameter of the pipe end 28*a*. The taper 34' on the sleeve 24' acts to stop rotation of the coupling 10' within the corrugated spiral pipe end 28*a*. A sealant may be used between the tubular end 14' and the corrugated spiral pipe end 28*a* to reduce infiltration or exfiltration as described with reference to FIG. 3. Alternatively, an annular resilient gasket (not shown) may be adhered to the circumferential stop 18' within coupling 10' to form a fluid or soil tight seal with the free end 42 of the corrugated spiral pipe end 28*b* as it is slidably received within the sleeve 24'. In another embodiment, the gasket 40 (see FIG. 3) may be placed about the free edge 42 of the corrugated spiral pipe end 28*b* to improve the seal with the circumferential stop 18' within the coupling 10.

Figure 6:
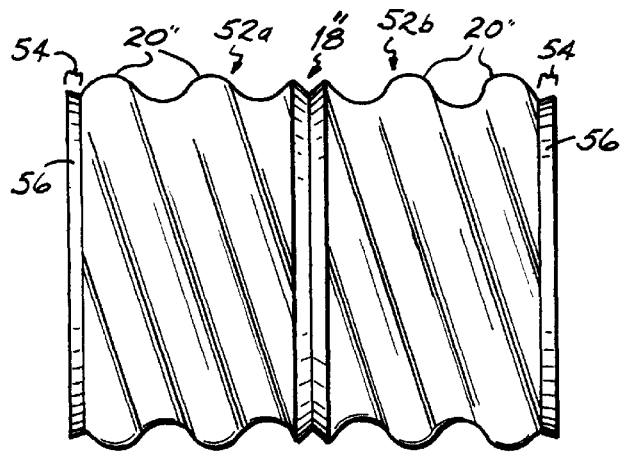
FIG. 6 is a side elevational view of a coupling in accordance with a fifth embodiment of the present invention.
Figure 7:
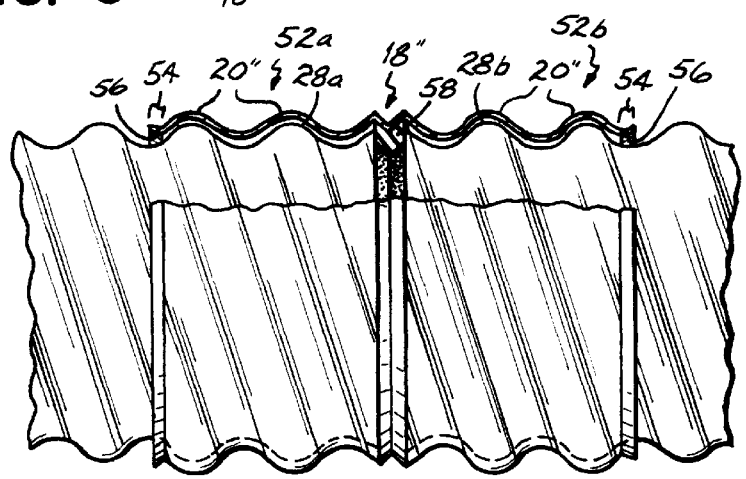
FIG. 7 is a side elevational view showing the coupling of FIG. 6, partially broken away, in use for joining adjacent ends of spiral corrugated pipe.

Now referring to an alternative embodiment of the present invention shown in FIG. 6, a coupling 10" is shown having generally tubular ends 52*a* and 52*b*, each of generally uniform thickness, extending radially outwardly from a circumferential stop 18". Each of the tubular ends 52*a* and 52*b* defines a substantially corrugated spiral or thread 20" which extends between the circumferential stop 18" and free edges 54 of the tubular ends. As shown most clearly in FIG. 7, the tubular ends 52*a* and 52*b* preferably have an inner diameter which is slightly larger than the outer diameter of the corrugated spiral pipe ends 28*a* and 28*b* to threadably connect about the outer diameter of the pipe ends 28*a* and 28*b*. Preferably, each of the free edges 54 defines a radially outwardly flared entry 56 to facilitate the initial threading of the tubular ends 52*a* and 52*b* about the outer diameters of corrugated spiral pipe ends 28*a* and 28*b*. In this alternative embodiment, the coupling 10" provides a high pull-apart resistance to prevent separation of pipe ends 28*a* and 28*b* from the coupling 10".

To reduce infiltration or exfiltration, an annular gasket 58 of resilient material may be adhered to the circumferential stop 18" within coupling 10" (see FIG. 7) to form a fluid or soil tight seal between the pipe ends 28*a* and 28*b* and the circumferential stop. It is also contemplated that sealants (not shown) as described above may be used between the threads 20" of the tubular ends 52*a* and 52*b* and respective pipe ends 28*a* and 28*b* to further reduce infiltration or exfiltration. Additionally, it will be appreciated that annular gaskets 40 (see FIG. 3) may be used at each pipe end 28*a* and 28*b* to form a seal with the circumferential stop 18" as described in detail above.

Figure 8:
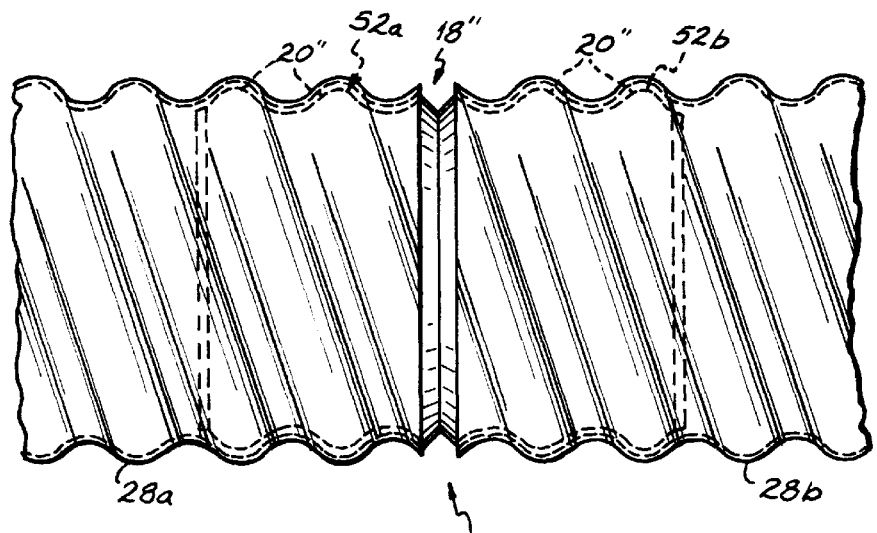
FIG. 8 is a side elevational view of a coupling in accordance with a sixth embodiment of the present invention.

Referring now to FIG. 8, an alternative embodiment is shown wherein the generally tubular ends 52*a* and 52*b* of coupling 10" have an outer diameter which is slightly less than the respective inner diameters of the corrugated spiral pipe ends 28*a* and 28*b*. In this embodiment, the pipe ends 28*a* and 28*b* thread about the outer diameter of the tubular ends 52*a* and 52*b* to interconnect the pipe ends and form a fluid or soil tight seal at the coupling. Alternatively, it will be appreciated that one of the tubular ends 52*a* or 52*b* of coupling 10" may thread about an outer diameter of a spiral corrugated pipe end 28*a* or 28*b*, while the other tubular end may thread within an inner diameter of the other pipe end. As described in detail above, a commercially available standard sealant may be used between the threads 20" of the tubular ends 52*a* and 52*b* and respective spiral corrugated pipe ends 28*a* and 28*b*.

Those skilled in the art will appreciate that couplings 10, 10' and 10" are particularly adapted for interconnecting adjacent ends of corrugated pipe and are readily installable in the field without extensive manipulation of the pipe ends. The couplings 10, 10' and 10" do not require complicated latching structures or sealants to form a connection at the pipe joint. Moreover, the couplings 10, 10' and 10" provide versatile configurations for addressing different infiltration and exfiltration requirements which may be encountered with various applications.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, while the coupling 10 has been described as preferably being made of rigid plastic, other suitable materials are also contemplated without departing from the spirit and scope of the present invention. Additionally, while the present invention is particularly adapted for interconnecting adjacent ends of spiral corrugated pipe, it is also contemplated that sleeve 24 may slidably receive other types of corrugated pipes (i.e., non-spiral) or even non-corrugated pipes. The invention in its broader aspects is therefore not limited to the specific details, representative apparatus and method, and illustrative example shown and described. Accordingly, departures may be made from such details without departing from the spirit or scope of applicant's general inventive concept.

Having described the invention, I claim:

1. A coupling for interconnecting adjacent ends of corrugated pipe, comprising:

a generally cylindrically shaped body having first and second generally tubular ends and a circumferential stop therebetween, said first tubular end defining a substantially continuous spiral corrugation extending between said circumferential stop and a free edge thereof, said first tubular end being adapted to rotatably thread to one of said adjacent ends of corrugated pipe, and said second tubular end having an inner wall of generally constant diameter defining a sleeve extending substantially between said circumferential stop and a free edge thereof, said second tubular end being adapted to slidably receive in an axial direction the other of said adjacent ends of corrugated pipe within said sleeve whereby said coupling interconnects said adjacent ends of corrugated pipe.

2. The coupling of claim 1 wherein said first tubular end is adapted to rotatably thread about the outer diameter of said one adjacent end of corrugated pipe.

3. The coupling of claim 1 wherein said first tubular end is adapted to rotatably thread within the inner diameter of said one adjacent end of corrugated pipe.

4. The coupling of claim 1 wherein said continuous spiral corrugation of said first tubular end has an inner diameter which decreases along the length thereof from said free edge to said circumferential stop.

5. The coupling of claim 1 wherein said continuous spiral corrugation of said first tubular end has an inner diameter which is substantially constant along a partial length thereof from said free edge to said circumferential stop and decreases adjacent said circumferential stop.

6. The coupling of claim 1 wherein said circumferential stop includes a circumferential gasket associated therewith for engaging at least one of said adjacent ends of corrugated pipe.

7. The coupling of claim 1 further comprising a sealant disposed intermediate said first tubular end and said one adjacent end of corrugated pipe.

8. The coupling of claim 1 further comprising a gasket disposed intermediate said circumferential stop and said other of said adjacent ends of corrugated pipe.

9. The coupling of claim 1 further comprising a gasket disposed intermediate said second tubular end and said other of said adjacent ends of corrugated pipe.

10. The coupling of claim 1 wherein at least one of said free edges of said first and second tubular ends is flared radially outwardly to facilitate connection of said coupling with a respective one of said adjacent ends of corrugated pipe.

11. The coupling of claim 1 wherein said circumferential stop comprises a continuous radially inwardly extending annular ring.

12. A coupling for interconnecting adjacent ends of corrugated pipe, comprising:

a generally cylindrically shaped body having first and second generally tubular ends and a circumferential stop therebetween, said first tubular end having a substantially continuous spiral corrugation of generally uniform thickness extending between said circumferential stop and a free edge thereof, said first tubular end being adapted to rotatably thread to one of said adjacent ends of corrugated pipe, and said second tubular end having a substantially continuous spiral corrugation of generally uniform thickness extending between said circumferential stop and a free edge thereof, said second tubular end being adapted to rotatably thread to the other of said adjacent ends of corrugated pipe whereby said coupling interconnects said adjacent ends of corrugated pipe.

13. The coupling of claim 12 wherein at least one of said first and second tubular ends is adapted to rotatably thread about the outer diameter of a respective one of said adjacent ends of corrugated pipe.

14. The coupling of claim 12 wherein at least one of said first and second tubular ends is adapted to rotatably thread within the inner diameter of a respective one of said adjacent ends of corrugated pipe.

15. The coupling of claim 12 wherein at least one of said continuous spiral corrugations of said first and second tubular ends has an inner diameter which decreases along the length thereof from said respective free edge to said circumferential stop.

16. The coupling of claim 12 wherein at least one of said continuous spiral corrugations of said first and second tubular ends has an inner diameter which is substantially constant along a partial length thereof from said respective free edge to said circumferential stop and decreases adjacent said circumferential stop.

17. The coupling of claim 12 wherein said circumferential stop includes a circumferential gasket associated therewith for engaging at least one of said adjacent ends of corrugated pipe.

18. The coupling of claim 12 further comprising a sealant disposed intermediate at least one of said first and second tubular ends and a respective one of said adjacent ends of corrugated pipe.

19. The coupling of claim 12 wherein at least one of said free edges of said first and second tubular ends is flared radially outwardly to facilitate connection of said coupling with a respective one of said adjacent ends of corrugated pipe.

20. The coupling of claim 12 wherein said circumferential stop comprises a continuous radially inwardly extending annular ring.

* * * * *